(No Model.)
C. WILLGANSZ.
GRADING LEVEL.
No. 334,149. Patented Jan. 12, 1886.
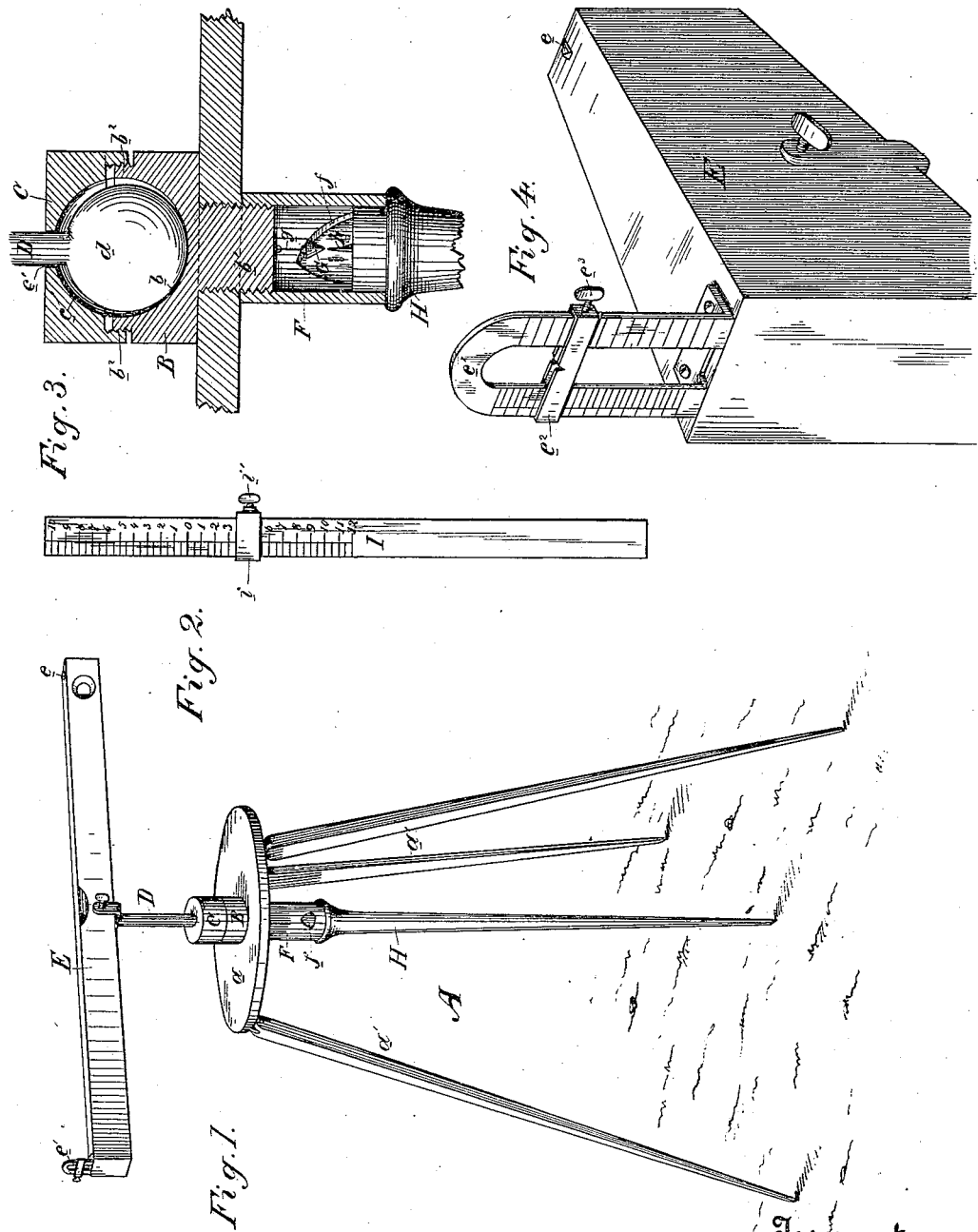

UNITED STATES PATENT OFFICE.

CHRISTIAN WILLGANSZ, OF LITTLE STONEY, CALIFORNIA.

GRADING-LEVEL.

SPECIFICATION forming part of Letters Patent No. 334,149, dated January 12, 1886.

Application filed July 11, 1885. Serial No. 171,364. (No model.)

*To all whom it may concern:*

Be it known that I, CHRISTIAN WILLGANSZ, of Little Stoney, Colusa county, State of California, have invented an Improvement in Grading-Levels; and I hereby declare the following to be a full, clear, and exact description of the same.

My invention relates to that class of surveying-instruments used for determining the grade of land.

My invention consists in a stand or tripod having attached to it a fixed gage-leg and a plumb by which the perpendicular between the ground and the top of the stand remains constant, and in a swiveled level supported by a tripod and having sights upon it, one of which is vertically adjustable for determining accurately the amount of grade necessary for a given work in a certain distance.

It consists, further, in details of construction relating to the attachment and arrangement of the gage-leg, the plumb, and the level, all of which I shall hereinafter fully explain.

The object of my invention is to provide a surveying-instrument by which I can readily determine whether one point is lower or higher than another and the difference between them, and can also accurately indicate and determine the amount of grade necessary for a given work, as for a ditch from one point to another.

Referring to the accompanying drawings, Figure 1 is a perspective view of my instrument. Fig. 2 is an elevation of the gage-stick to be used in connection with the instrument. Fig. 3 is a vertical section of the upper portion of the instrument, showing the manner of attaching the level and the position of the plumb and gage-leg. Fig. 4 is a perspective view of the level, showing its sights.

The stand or tripod, which is here designated generally by the letter A, consists of a top, $a$, and three legs, $a'$, pivoted to the top in any suitable manner adapting them to swing in radial planes.

B is a bed-casting having in its top a semicircular socket, $b$, and on its bottom an externally-threaded stem or shank, $b'$. The top of the casting B is turned down, and is externally threaded at $b^2$.

C is a casting forming the cap. It is provided with a semicircular socket, $c$, in its bottom, with which a hole, $c'$, passing through its top, communicates. The cap is screwed onto the threaded portion $b^2$ of the bed B.

D is a shank or stem passing through hole $c'$, and having on its lower end the ball $d$, which is confined between the cap C and the bed B, as shown.

On the top of the stem D is the level E, supported by a suitable bracket. By this ball-and-socket joint the level E may be swiveled in any direction, and may be tightened to its position by screwing down the cap C, so that the ball $d$ is clamped in the sockets $c\ b$.

F is a tube or pipe, the upper end of which is screwed onto the downwardly-projecting end of the shank $b'$.

Hung by a small string, $g$, from the bottom of the stem $b'$ is the plumb-bob G, which hangs within the tube F.

Secured in the lower portion of the tube is the gage-leg H, on the upper end of which, and within the tube F, is the vertical cone-point $h$, directly below the plumb-bob.

Elongated apertures $f$ are made in the tube F, to enable the operator to see the plumb-bob and its opposing point $h$.

On one end of the top of the level is a small beveled sight, $e$. At its other end is a sight consisting of a slotted standard, $e'$, upon which is fitted and adapted to slide a sleeve, $e^2$, which may be set in any position by a screw, $e^3$. The standard is graduated to a suitable scale.

I, Fig. 2, is my gage-stick. It consists of an ordinary stick provided with a sliding sleeve, $i$, set by a screw, $i'$. This stick is provided with a scale, the zero-mark of which is to be exactly of the same height from the ground as the top of the level E when both are on a level plane and the tripod is standing plumb and the level adjusted.

The operation of the instrument is as follows: The tripod is set up at the point of beginning and its swinging legs are moved out until its gage-leg H touches the ground. The swinging legs are then adjusted until the plumb-bob hangs down directly over its opposing point, the gage-leg still touching the ground. This will show that the gage-leg is in true perpendicular, and will therefore give a fixed or stated perpendicular from the ground to the level. The level is now adjusted on its ball-and-socket joint until it is perfectly level. The assistant takes out the gage-stick I to any suitable distance, and there stands it on the ground. The sliding sleeve $e^2$ on the standard $e'$ of the level is moved down to its lower limit, so that it shall be in perfect line with the sight $e$. I then sight over the level and direct the assistant to move the sliding sleeve $i$ up or down on the stick, as may be required. For example, if the ground where the stick stands is higher than that where the instrument is placed he will have to move the sleeve $i$ down below the zero-mark, which, as I have stated before, is on exactly the same level as the level E when both stick and tripod are standing on the same level plane. If the ground is low where the stick is, he will move the sleeve above the zero-mark. A note is made of the distance above or below the zero-mark, and the tripod is then moved forward and placed in a position so that its gage-leg will stand upon the exact spot where the stick I had stood. I then manipulate the swinging legs of the tripod until the plumb-bob hangs true again, when it will be seen that the level E is exactly the same distance from the ground that it was in the first position. The stick I is again moved forward a suitable distance and I sight to it once more, making note of the elevation or depression as before, and so the operation is continued to the end, when by observing the notes made it will be seen whether the point reached is higher or lower than the point of beginning. If it is lower, I have to continue until I find a point higher. From my notes I am also enabled to determine what the amount of elevation is, and, knowing the distance from the point of beginning, I can readily determine by calculation the amount of grade necessary for the proposed work. Going back to the point of beginning, I raise the adjustable sight of the level by setting up sleeve $e^2$ on the standard $e'$ the required distance, this being determined by the known separation of the two sights on the level and the entire amount of elevation in the whole distance. The assistant then goes out with the gage-stick to such distance as may be determined upon. I then sight to the stick from the small sight $e$ over the adjustable sight and instruct the assistant to set the bottom of the stick upon a peg or stake which is of a height sufficient to raise the zero-mark of the stick to the line of my sights. I then go forward again and set the gage-leg of the instrument on the top of the peg or stake which was driven in the ground by the assistant, and the operation is repeated throughout the whole course, thus giving me a set grade.

It will be observed in this instrument that the principal feature is the employment of the gage-leg in connection with the plumb-bob, by which I am enabled to set the instrument on any kind of ground, sloping or irregular, or level, and still keep the same fixed distance or perpendicular between the top of the level and the ground.

I need not confine myself to placing the gage-leg in the vertical center of the instrument, because it might be used as one of the main legs of the tripod, with the exception that it should be rigidly attached to the top of the tripod instead of pivoted; nor need I confine myself to the position of the plumb-bob here shown, as it may be located upon the instrument in any other position, its function being the same—namely, to indicate in connection with the fixed gage-leg when the true height is attained; but I prefer to arrange it as here shown, for the reason that it is out of the way and is not liable to any injury.

Having thus described my invention, what I claim as new, and desire to secure by Letters Patent, is—

1. In a grade-level, a stand or tripod provided with hinged or adjustable legs, in combination with a fixed gage-leg and a plumb by which the height of the tripod may be kept constant, substantially as herein described.

2. In a grading-level, the combination of a stand or tripod having hinged or adjustable legs, a level swiveled upon the tripod, a fixed gage-leg secured to the tripod and adapted to rest upon the ground, and a plumb attached to the tripod, whereby the perpendicular distance between the ground and the level may remain constant, substantially as herein described.

3. In a grading-level, the stand or tripod A, having hinged or adjustable legs, in combination with the gage-leg H, secured to the tripod, and the plumb-bob G, suspended from under the tripod and above the leg, substantially as herein described.

4. In a grading-level, the tripod A, consisting of the top $a$ and hinged legs $a'$, in combination with the level E, swiveled on the top $a$, the tube or pipe F, having apertures $f$, the plumb-bob G, within the tube, and the gage-leg H, fitted in the lower end of the tube, substantially as herein described.

5. In a grading-level, the stand or tripod A, having hinged legs, in combination with the tube F, secured under the top of the tripod and having apertures $f$, the plumb-bob G, suspended within the tube, and the leg H, secured to the lower end of the tube and having the point $h$ opposing the plumb-bob, substantially as herein described.

6. In a grading-level, the tripod A, having the socketed bed B in its top for supporting the level, said bed having an externally-threaded stem, $b'$, projecting down through the top, in combination with the depending tube F, screwed to said stem and having apertures $f$, the plumb-bob G, suspended within the tube from the bottom of the stem, and the leg H, secured in the lower end of the tube and having the point $h$, substantially as herein described.

7. In a grading-level, the stand or tripod A, having a gage-leg rigidly secured thereto and a plumb, in combination with a level, E, swiveled on the top of the tripod and having sights on its ends, substantially as herein described.

8. In a grading-level, the stand or tripod A, having a gage-leg rigidly secured thereto and a plumb, in combination with the level E, swiveled on top of the tripod and having sights on its ends, one of which is vertically adjustable to indicate the amount of grade, substantially as herein described.

9. In a grading-level, the tripod A, having the gage-leg H, and plumb G, by which it is set, as described, in combination with the level E, mounted on the top of the tripod, the fixed sight $e$ at one end, and the adjustable sight at the other, consisting of the slotted and graduated standard $e'$ and the sliding sleeve $e^2$, substantially as herein described.

10. A grading-level comprising the tripod or stand A, having the top $a$ and hinged legs $a'$, the socketed pieces B C on the top of the tripod, the ball standard or stem D in said pieces, and the level E on the stem, and provided with sights, as described, the tube F under the top of the tripod having apertures $f$, the plumb-bob G, suspended in the tube, and the gage-leg H, fitted in the lower end of the tube and having a point, $h$, opposing the plumb-bob, all arranged and adapted to operate substantially as herein described.

In witness whereof I have hereunto set my hand.

CHRISTIAN WILLGANSZ.

Witnesses:
H. ARMSTRONG,
J. C. STOWALL.